Jan. 21, 1958     E. F. COOK     2,820,346
TWO-STAGE MASTER BRAKE CYLINDER
Filed Dec. 21, 1953
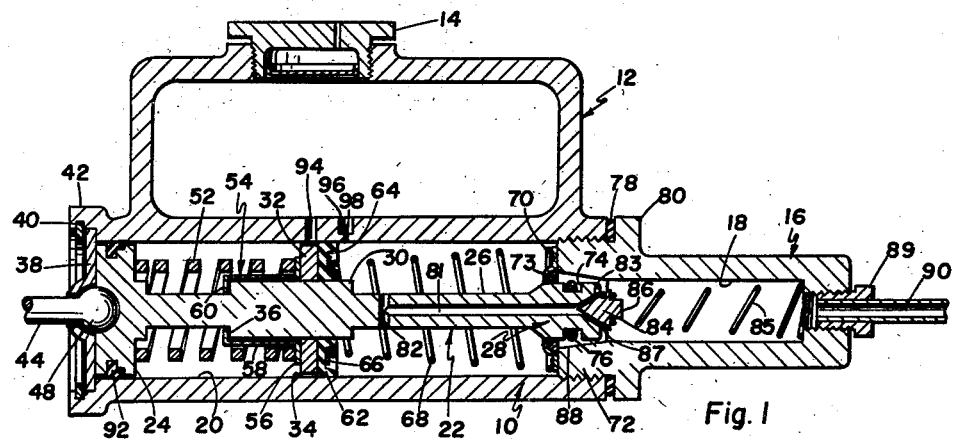
Fig. 1
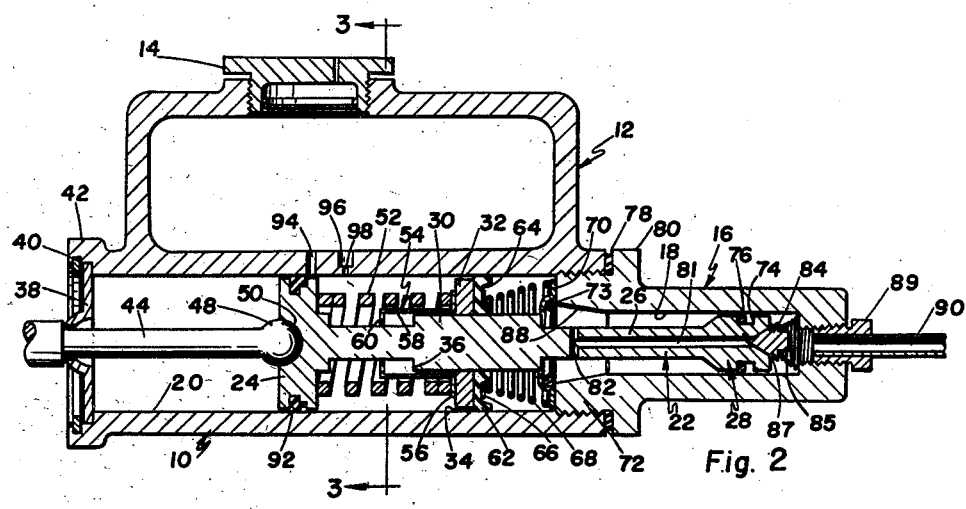
Fig. 2
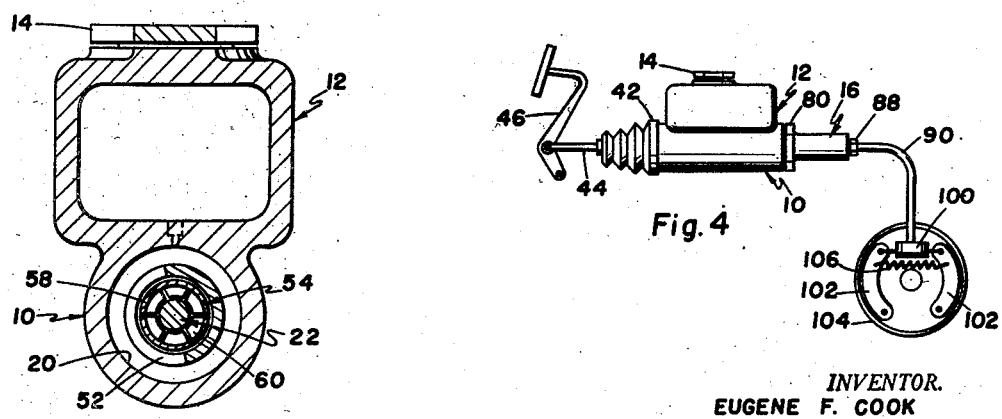
Fig. 3
Fig. 4
INVENTOR.
EUGENE F. COOK
BY
Knox & Knox
ATTORNEY IN FACT
FOR APPLICANT – # United States Patent Office 2,820,346
Patented Jan. 21, 1958

2,820,346

TWO-STAGE MASTER BRAKE CYLINDER

Eugene F. Cook, San Diego, Calif.

Application December 21, 1953, Serial No. 399,246

8 Claims. (Cl. 60—54.6)

The present invention relates generally to fluid brakes and more particularly to a two-stage master brake cylinder. This application is a continuation-in-part of my co-pending application Serial No. 344,407, filed March 24, 1953, now abandoned, although the invention disclosed therein has not been abandoned.

The primary object of this invention is to provide a fluid brake cylinder in which a large volume of fluid is first moved under a relatively low pressure to bring all brake shoes into contact with the brake drums, after which a small volume of fluid is moved under high pressure to apply the braking force.

Another object of this invention is to provide a brake cylinder with which a high braking pressure may be applied with a relatively low pressure on the brake controls.

Another object of this invention is to provide positive sealing of both high and low pressure chambers at the proper time to prevent fluid leakage.

Another object of this invention is to provide means for pre-tensioning the drive spring so as to permit sealing against fluid leakage from the low pressure chamber by means of a single sealing element.

Another object of this invention is to permit the use of a low pressure piston which does not require close tolerances to prevent fluid leakage.

Another object of this invention is to provide a pressure relief valve which will maintain a small static pressure in the brake system at all times and which only permits fluid at an excess pressure to pass in one direction. Energizing fluid does not pass through the pressure relief valve as in the conventional combination valve.

Another object of this invention is to provide a brake cylinder having a combination high pressure piston and secondary seal piston as a single unit.

Another object of this invention is to provide a two-stage master brake cylinder structure which may be adapted to many existing types of brake cylinders. The high pressure cylinder of the present invention is constructed as a separate unit which may be screwed into the end of a conventional brake cylinder after removing the end cap therefrom, the existing piston also being replaced by the two-stage piston assembly.

Finally, it is an object to provide a two-stage master brake cylinder of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims and illustrated in the drawing which forms a material part of this disclosure and wherein similar characters of reference indicate similar or identical elements and portions throughout the specification and throughout the views of the drawing and in which:

Fig. 1 is a longitudinal sectional view of the brake cylinder in idle position.

Fig. 2 is a longitudinal sectional view of the brake cylinder in full pressure position.

Fig. 3 is a sectional view taken on the line 3—3 of Fig. 2.

Fig. 4 is a diagrammatic view of the brake cylinder connected to a single brake drum.

Referring now to the drawing, the device comprises a low pressure cylinder 10 and an integral fluid reservoir 12 having a filler cap 14. Screwed into one end of the low pressure cylinder 10 is a high pressure cylinder 16, the bore 18 of which is concentric with the low pressure cylinder bore 20. Within the unit is a piston rod 22 having at one end a seal piston 24 which has a close sliding fit in the bore 20. Adjacent the other end of the piston rod 22 is a reduced diameter portion 26, the full diameter end of said piston rod constituting the high pressure piston 28. The full diameter mid-section 30 of the piston rod 22 provides a guide for the low pressure piston 32 which is slidable thereon, said low pressure piston having an annular clearance 34 from the bore 20 to allow the passage of fluid. The piston rod 22 is undercut between the seal piston 24 and the mid-section 30 to provide a shoulder 36.

The piston assembly is retained by an end cap 38 which is secured by a retaining ring 40 fitted into the flanged end 42 of the low pressure cylinder 10. Extending through the end cap 38 is a push rod 44 which is connected to a brake actuating pedal 46, as shown diagrammatically in Fig. 4, said push rod having a ball end 48 which seats in a socket 50 in the seal piston 24. This arrangement is substantially conventional.

Fitted between the low pressure piston 32 and the seal piston 24 is a heavy drive spring 52 which is pre-loaded to a specific degree and is held at that loading by a retaining clip 54. This retaining clip 54 has an outwardly disposed flange 56 which rests against the low pressure piston 32 and supports the end of the drive spring 52, said retaining clip having a sleeve portion 58 extending along the mid-section 30 and said sleeve portion having an inwardly turned flange 60 which rests on the shoulder 36. The retaining clip 54 is divided into two halves for convenience of assembly.

The low pressure piston 32 is provided with a sealing cup 62 having an annular recess 64. Fitted in the annular recess 64 is a seating ring 66 which receives one end of a return spring 68, the seating ring having an inwardly sloping wall so that the pressure of said return spring tends to wedge the sealing cup 62 tightly against the mid-section 30. The other end of the return spring 68 rests on a cupped sealing ring 70 which is held firmly against the plug portion 72 of the high pressure cylinder 16 and contains an O-ring 73.

The high pressure piston 28 has a groove 74 in which is fitted an O-ring 76 to seal said piston in the bore 18. The piston rod 22 has a longitudinal duct or bore 81 communicating between the end of the high pressure piston 28 and a transverse bore 82 passing diametrically through the reduced diameter portion 26 adjacent the mid-section 30. In the end of the high pressure piston 28 is a conical valve seat 83 in which is fitted a correspondingly shaped valve 84, said valve being held therein by a spring 85 which engages a plug portion 86 extending from the valve. The valve 84 is fitted with an O-ring 87 to ensure a tight seal in the valve seat 83.

The inner end of the high pressure cylinder bore 18 has an outwardly tapered portion 88 to permit excess fluid to bypass the high pressure piston 28 at the end of the return stroke, as well as to permit the removal of air during the normal bleeding of the brake system.

Screwed into the end of the high pressure cylinder 16 is a pipe nut 89 which secures the brake line 90.

The seal piston 24 is fitted with a sealing ring 92 to prevent leakage of fluid thereby. The fluid reservoir 12 communicates with the bore 20 by means of a relief port 94 and a transfer port 96 which has a reduced diameter aperture 98.

The brake line 70 is connected to a conventional wheel brake cylinder 100 which operates a pair of brake shoes 102 installed in a brake drum 104. The brake shoes 102 are held in the non-operative position by a return spring 106 and are forced against the brake drum 104 by fluid pressure in the cylinder 100 as in a conventional vehicle having four such units.

The brakes are actuated by depressing the brake pedal 46 in the normal manner. The initial depression moves the entire piston assembly along the cylinders, the low pressure piston 32 being carried by the pre-loaded drive spring 52. The low pressure piston 32 forces fluid through the bores 81 and 82 and past the valve 84, the pressure being sufficient to lift the valve against the bias of the spring 85. This initial pressure overcomes the brake shoe return spring 106 and forces the brake shoes 102 against the brake drum 104. Once the brake shoes are seated, the resistance causes sufficient back pressure to overcome the drive spring 52 so that the movement of the low pressure piston is arrested. At the same time the back pressure closes the valve 84, trapping the pressurized fluid in the high pressure of the cylinder.

The high pressure piston 28 continues to advance, the smaller diameter of said piston under the same continuing driving force resulting in considerably higher pressure being achieved than is possible with conventional brake cylinders. As the piston assembly advances, the fluid between the seal piston 24 and the low pressure piston 32 escapes through the relief port 94 to compensate for the reduction of space due to compression of the drive spring 52.

When the brake pedal 46 is released, the fluid pressure and the return spring 68 together force the piston assembly back along the cylinder. As the piston assembly returns, the annular clearance 34 allows fluid to flow past the low pressure piston 32 and the sealing cup 62 to refill the chamber between the low pressure piston and the high pressure cylinder 16. The low pressure cylinder 10 is replenished with fluid from the reservoir 12 through the relief port 94 and the transfer port 96. It should be noted that the reduced diameter aperture 98 prevents jamming of the sealing cup 62 and possible damage thereto.

As the piston assembly reaches the end of its return travel, the high pressure piston uncovers the tapered portion 88 allowing excess fluid to bypass the O-ring 73 and enter the low pressure cylinder. The pressure of the return spring 68, however, holds the sealing ring 70 in place thus sealing the O-ring 73 against the high pressure piston 28 and the face of the plug portion 72, so that a certain amount of static fluid pressure is maintained in the high pressure cylinder 16 and throughout the brake line fragmentarily illustrated at 90.

Due to the relatively large diameter of the low pressure piston 32 it is possible to force large quantities of fluid into the brake line 90, thus permitting longer wheel cylinder strokes and reducing the necessity for frequent brake shoe adjustments. A further important feature of the device is that the brake line pressure may be quickly pumped up to a safe working pressure, even when the brake shoe wear cannot be compensated for by a single stroke. This is made possible by the fact that the tapered portion 88 is not uncovered unless the high pressure piston 28 is allowed to return fully. Thus by a series of short pumping strokes, without allowing the full return of the piston assembly, considerable pressure may be built up, a charge of fluid being advanced past the high pressure piston 28 at each stroke of the low pressure piston 32 as described above.

The relatively short length of the high pressure piston 28 eliminates the need for close tolerances in the concentricity of the low pressure cylinder and high pressure cylinder. Thus the high pressure cylinder 16, together with the two-stage piston assembly, may be fitted to a conventional master brake cylinder, certain existing types being readily adaptable for this purpose.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention and that the specification and drawing are to be considered as merely illustrative rather than limiting.

I claim:

1. A two-stage master brake cylinder comprising a housing having therein a low pressure cylinder for connection with a fluid reservoir by means of ports, a high pressure cylinder axially aligned with and threadedly secured to said low pressure cylinder, a piston assembly consisting of a high pressure piston reciprocable in said high pressure cylinder, a seal piston and a low pressure piston reciprocable in said low pressure cylinder, said low pressure piston being mounted for axially sliding movement on said piston assembly, a pretensioned compression spring interposed between said seal piston and said low pressure piston, a passage through a portion of said piston assembly and connecting said high pressure cylinder to said low pressure cylinder, and a valve carried by said high pressure piston and closing said passage when the pistons are advanced during the pressure stroke thereof.

2. A two-stage master brake cylinder comprising a housing having therein a low pressure cylinder for connection with a fluid reservoir by means of ports, a high pressure cylinder axially aligned with said low pressure cylinder, a piston assembly consisting of a piston rod having at one end a seal piston reciprocable in said low pressure cylinder, the other end of said piston rod constituting a high pressure piston reciprocable in said high pressure cylinder, a low pressure piston slidably mounted on said piston rod, a drive spring between said seal piston and said low pressure piston, a return spring engaging the side of said low pressure piston remote from said drive spring and biasing said low pressure piston toward said seal piston, a passage through a portion of said piston assembly and connecting said high pressure cylinder to said low pressure cylinder, and a valve carried by said high pressure piston and closing said passage during the pressure stroke of the pistons.

3. A two-stage master brake cylinder comprising a housing having therein a low pressure cylinder for connection with a fluid reservoir by means of ports, a high pressure cylinder axially aligned with said low pressure cylinder, a piston assembly consisting of a piston rod having at one end a seal piston reciprocable in said low pressure cylinder, the other end of said piston rod constituting a high pressure piston reciprocable in said high pressure cylinder, a low pressure piston slidably mounted on said piston rod, a drive spring between said seal piston and said low pressure piston, a return spring engaging the side of said low pressure piston remote from said drive spring and biasing said low pressure piston toward said seal piston, said piston rod having a bore therethrough connecting said high pressure cylinder to said low pressure cylinder, a valve in said bore, and a spring biasing said valve toward closed position.

4. A two-stage master brake cylinder comprising a housing having therein a low pressure cylinder for connection with a fluid reservoir by means of ports, a high pressure cylinder axially aligned with said low pressure cylinder, a piston assembly consisting of a piston rod having at one end a seal piston reciprocable in said low pressure cylinder, the other end of said piston rod constituting a high pressure piston reciprocable in said high pressure cylinder, a low pressure piston slidably mounted on said piston rod, a drive spring between said seal piston and said low pressure piston, said drive spring being preloaded to a specific degree, a return spring engaging the side of said low pressure piston remote from said drive spring and biasing said low pressure piston toward said seal piston, said piston rod having a bore therethrough connecting said high pressure cylinder to said low pressure cylinder, a valve in said bore, and a spring biasing said valve toward closed position.

5. A two-stage master brake cylinder according to claim 4 wherein said piston rod has a reduced portion defining shoulder between said low pressure piston and said seal piston, a clip mounted within said drive spring and having one end engaging one end of the drive spring, the other end of the clip engaging said shoulder in one position of the clip, whereby said clip maintains said drive spring under compression.

6. A two-stage master brake cylinder comprising a housing having therein a low pressure cylinder for connection with a fluid reservoir by means of ports, a high pressure cylinder axially aligned with said low pressure cylinder, a piston assembly consisting of a piston rod having at one end a high pressure piston reciprocable in said high pressure cylinder, a seal piston and a low pressure piston reciprocable in said low pressure cylinder, said low pressure piston being mounted for axially sliding movement on said piston rod, a compression spring interposed between said seal piston and said low pressure piston, a passage through a portion of said piston rod and connecting said high pressure cylinder to said low pressure cylinder, and valve means closing said passage when the pistons are advanced during the pressure stroke thereof, said high pressure piston comprising a relatively short full diameter end portion of said piston rod, said piston rod having a reduced diameter portion adjacent said end portion to prevent binding of the piston rod during the pressure stroke thereof due to any imperfect alignment of said cylinders.

7. A two-stage master brake cylinder comprising a housing having therein a low pressure cylinder for connection with a fluid reservoir, a high pressure cylinder axially aligned with said low pressure cylinder, a piston assembly consisting of a piston rod having at one end a seal piston reciprocable in said low pressure cylinder, the other end of said piston rod constituting a high pressure piston reciprocable in said high pressure cylinder, a low pressure piston slidably mounted on said piston rod, a drive spring between said seal piston and said low pressure piston, said piston rod having a shoulder between said low pressure piston and said seal piston, a clip mounted within said drive spring and having one end engaging one end of the drive spring, the other end of the clip engaging said shoulder in one position of the clip, whereby said clip maintains said drive spring in compression, a return spring between said low pressure piston and the end of said low pressure cylinder, a duct in said piston rod connecting said high pressure cylinder to said low pressure cylinder, a valve in said high pressure piston closing said bore, and a spring biasing said valve toward closed position.

8. A two-stage master brake cylinder comprising a housing having therein a low pressure cylinder for connection with a fluid reservoir, a high pressure cylinder axially aligned with said low pressure cylinder, a piston assembly consisting of a piston rod having at one end a seal piston reciprocable in said low pressure cylinder, the other end of said piston rod constituting a high pressure piston reciprocable in said high pressure cylinder, a low pressure piston slidably mounted on said piston rod, a drive spring between said seal piston and said low pressure piston, said piston rod having a reduced portion defining a shoulder between said low pressure piston and said seal piston, a clip engaging said shoulder in one position thereof, said clip also engaging said drive spring and maintaining said drive spring in compression when in said position, a return spring compressed between said low pressure piston and the end of said low pressure cylinder remote from said drive spring, said high pressure cylinder having an outwardly tapered end adjacent said low pressure cylinder, a sealing ring surrounding said piston rod adjacent the entrance to said high pressure cylinder, said sealing ring being held by said return spring, said piston rod having a duct therein connecting said high pressure cylinder to said low pressure cylinder, a valve in said duct, and a spring biasing said valve toward closed portion.

References Cited in the file of this patent

UNITED STATES PATENTS

| Number | Name | Date |
|---|---|---|
| 2,009,105 | Carroll | July 23, 1935 |
| 2,291,056 | Pallady | July 28, 1942 |
| 2,298,314 | Sauzedde | Oct. 13, 1942 |
| 2,354,957 | Loweke | Aug. 1, 1944 |
| 2,358,021 | Miller | Sept. 12, 1944 |
| 2,366,119 | Majneri | Dec. 26, 1944 |
| 2,518,821 | Roy | Aug. 15, 1950 |
| 2,587,023 | Allyn | Feb. 26, 1952 |
| 2,597,404 | Teske | May 20, 1952 |
| 2,666,294 | Porter | Jan. 19, 1954 |